United States Patent [19]
Morimoto et al.

[11] Patent Number: 5,827,928
[45] Date of Patent: Oct. 27, 1998

[54] ONE-COMPONENT, THERMOSETTING RESIN COMPOSITION FOR COATING USE

[75] Inventors: Hideo Morimoto, Hirakata; Takashi Irie, Suita; Kei Aoki, Ikoma; Haruhiko Sawada, Osaka, all of Japan

[73] Assignee: Nippon Paint Co., Ltd., Osaka, Japan

[21] Appl. No.: 630,630

[22] Filed: Apr. 11, 1996

[30] Foreign Application Priority Data

Apr. 12, 1995 [JP] Japan ................................ 7-111152

[51] Int. Cl.$^6$ ............................ C08F 20/00; C08F 20/52
[52] U.S. Cl. ..................... 525/217; 525/218; 525/221; 525/222; 525/245; 526/218.1
[58] Field of Search .................................. 525/217, 218, 525/221, 222, 445; 526/218.1

[56] References Cited

U.S. PATENT DOCUMENTS

| | | |
|---|---|---|
| 5,017,649 | 5/1991 | Clemens et al. ..................... 525/59 |
| 5,021,511 | 6/1991 | Larson et al. ..................... 525/298 |
| 5,084,536 | 1/1992 | Brindopke et al. ................. 526/218.1 |
| 5,219,958 | 6/1993 | Noomen et al. ..................... 525/10 |

*Primary Examiner*—Irina S. Zemel
*Attorney, Agent, or Firm*—Millen, White, Zelano, & Branigan, P.C.

[57] ABSTRACT

A one-component, thermosetting resin composition curable through a Michael reaction between (a) a component having a plurality of α, β-unsaturated carbonyl groups and (b) a component having a plurality of activated methylene of activated methyne groups is disclosed. The curing reaction is catalyzed with a quaternary ammonium, quaternary phosphonium or tertiary sulfonium salt in the presence of a five-membered cyclic carbonate compound independently added to the composition or covalently attached to either component (a) or component (b).

13 Claims, No Drawings

ONE-COMPONENT, THERMOSETTING RESIN COMPOSITION FOR COATING USE

FIELD OF THE INVENTION

This invention relates to a one-component, thermosetting resin composition for coating use. More paticularly, it relates to a resinous composition which cures through a Michael reaction.

BACKGROUND OF THE INVENTION

Michael reactions in which activated methylene is added to a polarized carbon-to-carbon double bond such as α, β-unsaturated carbonyl are utilized in the crosslinking of resinous compositions for coating use. These compositions are advantageous in that the Michael reaction gives a chemically stable crosslinking bond without forming any reaction by-product.

Typical examples of prior art include the following patents:

U.S. Pat. No. 4,408,018;
U.S. Pat. No. 5,017,649;
U.S. Pat. No. 5,084,536;
EP-A-0448154
JP-A-01/121341 (EP-A-0310011);
JP-A-01/204919 (EP-A-0326723);

Michael reactions in general require a base catalyst for forming carboanions from active hydrogen sites such as activated methylene or methyne group. Most of prior art compositions utilizing the Michael reaction for crosslinking employ a strong base such as alkali metal hydroxides, alkali metal alkoxides, quaternary ammonium hydroxides or carbonates, tertiary amines, guanidines, amidines and tertiary phosphines.

Because such strong base catalysts may catalyze the Michael reaction even at ambient temperature, systems containing the strong base generally have to be formulated into a two component composition. The strong base catalyst may also hydrolyze or otherwise deteriorate resin components when remained in the films applied on substrates. For examples, amines may cause yellowing of the cured films. Alkali metal based catalysts are hardly soluble in organic solvents conventially used in coating compositions and, therefore, may result, when used, in cured films of unsatisfactory appearance.

The present invention has its basis on the discovery that quaternary ammonium or like onium salts having no or little catalytic activity may exhibit an adequate activity on a Michael type crosslinking reaction in the presence of a five-membered cyclic carbonate component. The present invention may, therefore, achieve a number of advantages over the prior art compositions. The composition of the present invention may be formulated in a one-component or one-pot composition having a relatively long pot life while retaining an adequate curability upon heating.

SUMMARY OF THE INVENTION

The present invention provides a one-component, thermosetting resin composition for coating use comprising:

(a) a component containing a plurality of α, β-ethylenically unsaturated carbonyl functions in the molecule;

(b) a component containing a plurality of an activated methylene group or an activated methyne group;

(c) a quaternary ammonium salt, a quaternary phosphonium salt or a tertiary sulfonium salt which does not have catalytic activity at ambient temperature when used alone;

(d) a five-membered cyclic carbonate compound independently added to the composition or covalently attached to at least one of the above components (a) and (b).

The resin composition of the present invention may exhibit an adequate curability at elevated temperatures and has a relatively long pot life even formulated into a one-component composition. Unlike amine catalysts, the onium salt will not cause yellowing or other deterioration in the resulting cured films. Furthermore, the solubility of the onium salt in the solvents commonly used in coating compositions may be increased by suitably selecting hydrocarbon residues attached to the onium atom so as to ensure uniform dissolution in the composition.

DESCRIPTION OF THE PREFERRED EMBODIMENTS

Component (a)

Component (a) is a compound or polymer having a plurality of ethylenic unsaturations between carbon atoms at the α and β positions relative to a carbonyl group. Typical examples of such compound are acrylic or methacrylic (hereinafter collectively referred to as "(meth) acrylic") esters of polyhydric alcohols such as ethylene glycol di(meth)acrylate, diethylene glycol di(meth)acrylate, propylene glycol di(meth)acrylate, neopentyl glycol di(meth)acrylate, trimethylolpropane tri(meth)acrylate, glycerol tri (meth)acrylate, pentaerythritol tetra(meth)acrylate and the like. Acrylates or methacrylates of polyester polyols known as polyester acrylate resins fall within this class.

Unsaturated polyesters containing an unsaturated dicarboxylic acid such as maleic or fumaric acid may also be used as component (a). Unsaturated polyesters are used in large quantities for molding various FRP products and may be synthesized, as is well-known, by the polycondensation reaction between an α, β-unsaturated dicarboxylic acid component such as maleic anhydride or fumaric acid optionally containing other polycarboxylic acids such as phthalic anhydride, isophthalic, terephthalic, adipic, sebacic or trimellitic acid and a polyol component such as ethylene glycol, diethylene glycol, propylene glycol, tetramethylene glycol, 1,6-hexanediol, neopentyl glycol, trimethylolpropane, glycerine or pentaerythritol.

Other examples of component (a) include epoxy acrylate resins produced by reacting (meth)acrylic acid with an epoxy resin such as bisphenol or novolac type epoxy resins, and urethane acrylate resins produced by reacting a hydroxyl group-containing acrylic resin first with an organic polyisocyanate such as isophoronediisocyanate, tolylenediisocyanate, diphenylmethanediisocyanate, hexamethylenediisocyanate or a urethane prepolymer thereof and then with 2-hydroxyethyl (meth)acrylate.

Acrylic resins containing a plurality of α, β-unsaturated carbonyl functions may be produced via the ring-opening reaction of an epoxy ring with (meth)acrylic acid or the acylation of a hydroxyl group with (meth)acrylic acid. For example, epoxy group-containing acrylic resins may be produced by copolymerizing an epoxy group-containing acrylic monomer such as glycidyl (meth)acrylate with an acrylic monomer free of the epoxy group and/or a nonacrylic ethylenically unsaturated monomer. Examples of copolymerizable acrylic monomers include alkyl (meth)acrylates such as methyl, ethyl, propyl, n-butyl, isobutyl, t-butyl, 2-ethylhexyl or lauryl (meth)acrylate; hydroxyalkyl (meth) acrylates such as 2-hydroxyethyl (meth)acrylate; aryl or aralkyl (meth)acrylates such as phenyl or benzyl (meth) acrylate; PLACCEL FA1 or FM1 (adduct of 2-hydroxyethyl (meth)acrylate with polycaprolactone sold by Daicel Chemical Industries, Ltd.); and other acrylic monomers such as acrylamide, methylene-bis-acrylamide or acrylonitrile. Examples of copolymerizable non-acrylic monomers include styrene, α-methylstyrene, itaconic acid, maleic acid, vinyl acetate and the like. The epoxide function of the acrylic copolymer may then be opened with (meth)acrylic acid to introduce the α, β-unsaturated carbonyl function. Conversely, an epoxy group-containing acrylic monomer such as glycidyl (meth)acrylate may be reacted with an acrylic polymer containing a plurality of free carboxylic functions which may be produced by copolymerizing a carboxyl group-containing monomer such as acrylic, methacrylic or itaconic acid with a copolymerizable acrylic monomer and optionally with a non-acrylic monomer as discussed supra.

Acryl polyols containing a plurality of hydroxyl groups may be modified to have a plurality of α, β-unsaturated carbonyl functions by the acylation reaction with acrylic or methacrylic acid or a reactive derivative thereof such as chloride, or the transesterification reaction with a lower alkyl (meth)acrylate such as methyl (meth)acrylate. Acryl polyols may be produced by copolymerizing a hydroxyl group-containing acrylic monomer such as 2-hydroxyethyl (meth) acrylate, 2-hydroxypropyl (meth)acrylate, 4-hydroxybutyl (meth)acrylate or PLACCEL FM-1 with a copolymerizable acrylic and/or non-acrylic monomer as discussed supra.

Further examples of component (a) include polyether acrylate resins such as polyethylene glycol di(meth)acrylate, and silicone oligoners such as 3-methacryloyloxy-propyl-terminated polydiorganosiloxanes.

When component (a) is a resin, its molecular weight ranges between 400 and 100,000, preferably between 600 and 10,000, and the alkenyl equivalent weight ranges between 100 and 10,000, preferably between 100 and 1,000. The term "equivalent weight" as used herein refers to the molecular weight divided by the number of a function concerned.

Component (b)

Compounds or resins usable as component (b) have a plurality of activated methylene or methyne groups in the molecule. Typical examples of activated methylene compounds are acetoacetic acid, cyanoacetic acid, malonic acid and derivatives of these acids. Component (b) having a plurality of activated methylene groups may be prepared from these activated methylene carboxylic acids or derivatives thereof. For examples, polyols may be reacted with a reactive derivative of acetoacetic, cyanoacetic or malonic acid to obtain component (b). Polyols may be a polyhydric alcohol used in the production of unsaturated polyesters as the polyol component thereof, or a polymeric polyol such as acryl polyols, polyester polyols, polyether polyols, epoxy polyols, polyurethane polyols or silicone polyols. Reactive derivatives of acetoacetic, cyanoacetic or malonic acid may be their lower alkyl esters or halides. Polyester resins having a plurality of activated methylene groups may be produced by polycondensating a polycarboxylic acid component containing dialkyl malonates and a polyol component as discussed supra.

Component (b) having a plurality of acetoacetamide groups may be produced by reacting diketene with a polyamine such as ethylenediamine, 1,3-diaminopropane, 1,4-diaminobutane, 1,6-hexanediamine, 1,12-diaminododecane, 1,2-diaminocyclohexane, phenylenediamine, piperazine, 2,6-diaminotoluene, diethyltoluenediamine, N,N'-bis(2-aminopropyl)-ethylenediamine, or N,N'-bis(3-aminopropyl) -1,3-propanediamine.

Acrylic resins having a plurality of activated methylene groups may be produced by copolymerizing an acrylic monomer having an activated methylene group such as 2-acetoacetoxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethyl) benzylacrylamide, N-(2-acetoacetylaminoethyl)acrylamide or N-(2-acetoacetylaminoethyl)methacrylamide with an acrylic and/or nonacrylic monomer as discussed supra with regard to component(a).

Component (b) having a plurality of activated methyne groups may be produced, as disclosed in EP-A-0310011, by the transesterification between a trialkyl methanetricarboxylate and a nonpolymeric or polymeric polyol, or by the addition reaction between an activated methylene compound and an isocyanate compound. As will be apparent, either one of the activated methylene and isocyanate reactants should be polyfunctional. For example, a polyisocyanate reactant produced by reacting a diisocyanate with a polyol at an NCO/OH ratio of greater than 1 may be reacted with a monofunctional activated methylene reactant such as dialkyl molonate. Alternatively, those compounds or resins having a plurality of activated methylene groups as discussed supra may be reacted with a monofunctional isocyanate.

Component (b) may have both activated methylene and activated methyne groups in a mixture or in a single resin entity. For example, a copolymer of a monomer mixture containing an activated methylene-containing acrylic monomer and an activated methyne-containing acrylic monomer may be copolyemrized optionally with other comonomers.

When component (b) is a resin, its molecular weight ranges between 400 and 100,000, preferably between 600 and 10,000, and the active hydrogen equivalent weight ranges between 40 and 10,000, preferably between 80 and 5,000.

Component (c)

A variety of ammonium salts may be used. However, tetraalkyl and trialkylaralkyl type ammonium salts are preferred for economical reasons. Nitrogen-containing heterocyclic ammoniums salts such as those derived from pyridine, piperidine, piperazine or morpholine may also be used. Specific examples of ammonium cations include tetrabutylammonium, tetramethylammonium, tetraethylammonium, trimethylbenzylammonium, tetrapropylammonium, tetrahexylammonium, tetraoctylammonium, tetradecylammonium, tetrahexadecylammonium, triethylhexylammonium, 2-hydroxyethyltrimethylammonium (choline), methyltrioctylammonium, cetyltrimethylammonium, 2-chloroethyltrimethylammonium and methylpyridinium.

Counter anions should be capable of forming a non-basic stable salt with the ammonium cations and include halides, carboxylates, sulfonates, nitrate, nitrite, sulfate, sulfite, phosphate and acid phosphate esters. Specific examples thereof include acetate, laurate, glycolate, benzoate, salicylate, maleate, phthalate, chloride, bromide, iodide, methanesulfonate, p-toluenesulfonate, dodecylbenzene sulfonate, triflate, nitrate, sulfate, methosulfate, phosphate and acid t-dibutylphosphate. Quaternary phosphonium salts such as tetrabutylphosphonium bromide and tertiary sulfonium salts such as trimethylsulfonium iodide may also be used.

Onium salts having the above counter anions do not exhibit catalytic activity at ambient temperature when used alone but have catalytic activity only in the presence of component (d) under the conventional baking condition. Accordingly, they are useful when a thermosetting, storage stable, one-component composition is desired.

Component (d)

The term "five-membered cyclic carbonate compounds" as used herein refers to 2-oxodioxolane otherwise known as ethylenecarbonate and its derivatives. They are produced by reacting phosgene with 1,2-alkylenediol such as ethylene glycol, 1,2-propylene glycol or 1,2-butylene glycol to form a cyclic carbonate structure. When glycerine is reacted with phosgene, glycerine carbonate, namely 2-oxo-4-hydroxymethyldioxolane is produced. These compounds are examples of component (d) to be independently added to the composition of the present invention.

Polymerizable five-membered cyclic carbonate monomers may be produced from glycerine carbonate using the remaining hydroxyl group. For example, a polymerizable unsaturated group may be introduced to glycerine carbonate by etherifying with a polymerizable alcohol such as allyl alcohol or 1-propenyl alcohol, esterifying with a reactive derivative of (meth)acrylic acid such as halide, or reacting with methacryloylisocyanate. Homo- or copolymers of these monomers may also be added independently to the composition of this invention as component (d). Alternatively, these monomers may be bound to component (a) or component (b) through a covalent bond. For example, when component (a) or component (b) is an acrylic polymer, the cyclic carbonate monomer may be added to the mixture of comonomers and copolymerized therewith. Component (b) having bound thereto a five-membered cyclic carbonate may be produced by copolymerizing the cyclic carbonate monomer with an acrylic monomer having an activated methylene group and other acrylic and/or non-acrylic monomers.

Glycerine carbonate and its acrylate or methacrylate ester are preferable as component (d) when adding independently and when binding to component (a) or (b), respectively.

Curable resin compositions

The proportions of component (a) and component (b) in the curable resin composition of the present invention generally lie between 2:1 and 1:2, preferably between 1.5:1 and 1:1.5 relative to the double bond and the active hydrogen atom to be added thereto. The proportion of component (c) may range generally between 0.1 and 10.0 equivalent %, preferably between 0.2 and 5.0 equivalent % based on the sum of component (a) and component (b). The proportion of component (d) may range generally between 0.5 and 100 equivalent %, preferably between 5.0 and 40 equivalent % based on the sum of component (a) and component (b).

When used as a coating composition, it may contain a variety of conventional additives such as solvents, extender pigments, coloring pigments, sag-preventing agents, UV absorbers and the like. After applying onto a substrate as a film, the composition may be cured by baking the film at a temperature between 100° C. and 250° C., preferably between 140° C. and 220° C.

The curable resin composition may find use as a clear top coat composition to be applied on a color base coat. The base coat composition may be solvent type or water-borne compositions containing metallic or solid color pigments. The base and top coats may conveniently be applied using so-called two coats-one bake method by applying the top coat on the base coat wet-on-wet and then baking both coats simultaneously. When the base coat is a water-borne system, it is preferable to subject the base coat to a preheating step at a temperature of 60°–100 ° C. for 2–10 minutes before applying the top coat thereon. Base coat compositions useful in the above applications are disclosed, for example, in U.S. Pat. Nos. 5,151,125 and 5,183,504. Particularly, a water-borne composition disclosed in Example 1 of U.S. Pat. No. 5,183,504 may be used to advantage in combination with the composition of the present invention used as a top coat in order to give a multi-layer coating having satisfactory finish, appearance and other properties. It is very important for the top coat to be used for the above application particularly for finishing automobile bodies to have a satisfactory scratch resistance and acid rain resistance. The composition of the present invention is advantageous in these properties over conventional systems containing a melamine resin as a crosslinker.

The following examples are intended to illustrate the present invention without limiting thereto. All parts and per cents therein are by weight unless otherwise specified.

Production Example 1

To a 4-necked flask charged with 360 parts of xylene was added dropwise a monomer mixture containing a polymerization initiator shown in Table 1 at 110° C. over 3 hours. After the addition, the mixture was allowed to react at 110° C. for 30 minutes. Then 2 parts of KAYAESTER O (t-butylperoxyoctate sold by Nippon Kayaku Co., Ltd.) in 40 parts of xylene were added dropwise at 110° C. over 30 minutes and the mixture allowed to react at the same temperature for additional 90 minutes. An acrylic resin solution having 49.4% nonvolatiles, a number average molecular weight Mn measured by the GPC method of 4,300, an activated methylene equivalent weight of 200, and a carbonate equivalent weight of 1002 was obtained.

Production Examples 2–5

Production Example 1 was followed using a mixture shown in Table 1, respectively. Nonvolatile contents, Mn's and other data are also shown in Table 1.

TABLE 1

| Material, parts | Production Example | | | | |
|---|---|---|---|---|---|
| | 1 | 2 | 3 | 4 | 5 |
| 2-Acetoacetoxyethyl methacrylate | 214 | 214 | 107 | 107 | — |
| 2-Hydroxyethyl methacrylate | — | — | 65 | 65 | — |
| n-Butyl methacrylate | 111 | 186 | — | — | 240 |
| Methyl methacrylate | — | — | 57 | 65 | 59 |
| Styrene | — | — | 71 | 93 | — |
| n-Butyl acrylate | — | — | 61 | 70 | — |
| Glycidyl methacrylate | — | — | — | — | 101 |
| Carbonate monomer[1] | 75 | — | 37 | — | — |
| KAYAESTER O | 18 | 18 | 18 | 18 | 18 |
| Nonvolatile, % | 49.4 | 49.4 | 50.6 | 50.9 | 50.8 |
| Mn | 4,300 | 4,400 | 4,600 | 4,500 | 4,900 |
| Active H equivalent wt. | 200 | 200 | 267 | 267 | — |
| Carbonate equivalent wt. | 1,002 | — | 2,004 | — | — |
| Epoxy equivalent wt. | — | — | — | — | 561 |

[1]Glycerine carbonate methacyrlate ester

Production Example 6

To 394 part of the acrylic resin solution of Production Example 5 (200 parts as solids) were added 0.1 parts of hydroquinone, 1.0 part of tetrabutylammonium bromide and 30 parts of methacrylic acid. The mixture was allowed to react at 120° C. until an acid number of less than 1 was reached. A resin solution having a nonvolatile content of 53.0%, and an alkene equivalent weight of 630 was obtained.

Production Example 7

A reactor was charged with 236 parts of 1,6-hexanediol, 78 parts of dimethyl phthalate, 230 parts of dimethyl maleate and 1 part of dibutyltin oxide. The mixture was heated gradually to 200° C. while distilling off methanol formed by a transesterification reaction. Then the reaction was continued at 200 ° C. until no distillation of methanol was found. After cooling 250 parts of xylene were added. A resin solution having a nonvolatile content of 61.4%, Mn of 1,700, and an alkene equivalent weight as solids of 480 was obtained.

Production Example 8

A reactor was charged with 236 parts 1,6-hexanediol, 264 parts of dimethyl malonate and 1 part of dibutyltin oxide. The mixture was heated gradually to 200° C. while distilling off methanol formed by a transesterification reaction. Then the reaction was continued at 200° C. until no distillation of methanol was found. After cooling 250 parts of xylene were added. A resin solution having a nonvolatile content of 58.8%, Mn of 1,800 and an active hydrogen equivalent weight as solids of 184.2 was obtained.

Example 1

405 parts of the resin solution of Production Example 1 (200 parts as solids), 80 parts of pentaerythritol triacrylate (PETA) and 2 parts of tetrabutylammonium bromide (TBABr) were thoroughly mixed to make a solution. The solution was applied on a tinplate using a #40 bar coater and heated in an oven at 160° C. for 20 minutes. The gel fraction of the resulting cured film was determined based on the difference of weight before and after soaking the film in a 1:1 mixture of acetone and methanol at room temperature for 48 hours. The result is shown in Table 2.

Example 2

Example 1 was followed using 405 parts (200 parts as solids) of the resin solution of Production Example 2, 80 parts of PETA, 20 parts of glycerine carbonate and 2 parts of TBABr. The gel fraction of the cured film is shown in Table 2.

Comparative Example 1

Example 1 was followed except that 405 parts of the resin solution of Production Example 2 (200 parts as solids) were replaced for the resin solution of Production Example 1. The results are shown in Table 2.

Example 3

Example 1 was followed using 395 parts (200 parts as solids) of Production Example 3, 60 parts of PETA and 4 parts of trimethylbenzylammonium chloride (BTMAC1). The gel fraction of the cured film is shown in Table 2.

Comparative Example 2

Example 3 was followed except that 393 parts (200 parts as solids) of the resin solution of Production Example 4 were replaced for the resin solution of Production Example 3. The gel fraction of the cured film is shown in Table 2.

Example 4

A blend of 395 parts of the resin solution of Production Example 3 (200 parts as solids), 150 parts of EPOXY ESTER 3002A(reaction product of propylene oxide-bisphenol A adduct diglycidyl ester with acrylic acid sold by Kyoeisha Yushi Kogyo Kogyo) and 3 parts of tetrabutylammonium iodide (TBAI) was applied on a tinplate, baked at 160° C. for 20 minutes, and tested for the gel fraction. The result is shown in Table 3.

Comparative Example 3

Example 4 was followed except that 393 parts (200 parts as solids) of Production Example 4 were replaced for the resin solution of Production Example 3. The gel fraction of the cured film is shown in Table 3.

Example 5

A blend of 405 parts (200 parts as solids) of the resin solution of Production Example 2, 100 parts of UA-306H (adduct of hexamethylenediisocyanate and pentaerythritol triacrylate at 1:2 moles sold by Kyoeisha Yushi Kagaku Kogyo K.K.), 20 parts of glycerine carbonate and 3 parts of cetylpyridinium chloride (CPCl) was applied on a tinplate, baked at 160° C. for 20 minutes, and tested for the gel fraction. The result is shown in Table 3.

Comparative Example 4

Example 5 was followed using a blend of 405 parts (200 parts as solids) of the resin solution of Production Example 2, 100 parts of UA-306H and 3 parts of CPC1. The gel fraction is shown in Table 3.

Example 6

A blend of 395 parts (200 parts as solids) of the resin solution of Production Example 3, 150 parts of NK ESTER A-400 (polyethylene glycol (n=9) diacrylate sold by Shin-Nakamura Kagaku Kogyo K.K.) and 2 parts of TBABr was applied on a tinplate, baked at 220° C. for 1 minute, and tested for the gel fraction. The result is shown in Table 3.

Comparative Example 5

Example 6 was followed except that 393 parts (200 parts as solids) of the resin solution of Production Example 4 were replaced for the resin solution of Production Example 3. The gel fraction is shown in Table 3.

TABLE 2

|  | Example 1 | Example 2 | Comp. Ex. 1 | Example 3 | Comp. Ex. 2 |
| --- | --- | --- | --- | --- | --- |
| Component (a), parts | PETA 80 | PETA 80 | PETA 80 | PETA 60 | PETA 60 |
| Component (b), parts | Pro. Ex. 1 405 | Pro. Ex. 2 405 | Pro. Ex. 2 405 | Pro. Ex. 3 395 | Pro. Ex. 4 393 |
| Component (c), parts | TBABr 2 | TBABr 2 | TBABr 2 | BTMAC1 4 | BTMAC1 4 |
| Component (d), parts | Contained in (b) | Glycerine carbonate 20 | Not present | Contained in (b) | Not present |
| Baking condition | 160° C. × 20 min | 160° C. × 20 min | 160° C. × 20 min | 160° C. × 20 min | 160° C. × 20 min |
| Gel fraction, % | 92.1 | 88.3 | 74.7 | 91.6 | 69.4 |

TABLE 3

|  | Ex. 4 | Comp. Ex. 3 | Ex. 5 | Comp. Ex. 4 | Ex. 6 | Comp. Ex. 5 |
|---|---|---|---|---|---|---|
| Component (a), parts | 3002A 150 | 3002A 150 | UA-306H 100 | UA-306H 100 | A-400 150 | A-400 150 |
| Component (b), parts | Pro. Ex. 3 395 | Pro. Ex. 4 393 | Pro. Ex. 2 405 | Pro. Ex. 2 405 | Pro. Ex. 3 395 | Pro. Ex. 4 395 |
| Component (c), parts | TBAI 3 | TBAI 3 | CPC1 3 | CPC1 3 | TBABr 2 | TBABr 2 |
| Component (d), parts | Contained in (b) | Not present | Glycerine carbonate 20 | Not present | Contained in (b) | Not present |
| Baking Condition | 160° C. × 20 min | 160° C. × 20 min | 160° × 20 min | 160° C. × 20 min | 220° C. × 1 min | 220° C. × 1 min |
| Gel fraction, % | 93.2 | 81.2 | 89.2 | 72.4 | 91.5 | 76.3 |

Example 7

A blend of 377 parts (200 parts as solids) of the resin solution of Production Example 6, 30 parts of di-trimethylolpropane tetraacetoacetate (DTMPTA), 20 parts of glycerine carbonate and 3 parts of TBABr was applied on a tinplate, baked at 160° C. for 20 minutes, and tested for the gel fraction. The result is shown in Table 4.

Comparative Example 6

Example 7 was followed except that glycerine carbonate was not added. The gel fraction is shown in Table 4.

Example 8

A blend of 326 parts (200 parts as solids) of the resin solution of Production Example 7, 70 parts of DTMPTA, 30 parts of glycerine carbonate and 4 parts of TBAI was applied on a tinplate, baked at 160° C. for 20 minutes, and tested for the gel fraction. The result is shown in Table 4.

Comparative Example 7

Example 8 was followed except that glycerine carbonate was not added. The gel fraction is shown in Table 4.

Example 9

A blend of 377 parts (200 parts as solids) of the resin solution of Production Example 6, 127 parts of MACRYNAL LH437 (polyfunctional methanetricarboxylic acid ester sold by Hoechet), 20 parts of glycerine carbonate and 3 parts of CPC1 was applied on a tinplate, baked at 160° C. for 20 minutes, and tested for the gel fraction. The result is shown in Table 5.

Comparative Example 8

Example 9 was followed except that glycerine carbonate was not added. The gel fraction is shown in Table 5.

Example 10

A blend of 377 parts (200 parts as solids) of the resin solution of Production Example 6, 20 parts of 1,3-cyclohexane-bis(methylacetoacetamide) (HBA), 20 parts of glycerine carbonate and 3 parts of CPC1 was applied on a tinplate, baked at 160° C. for 20 minutes, and tested for the gel fraction. The result is shown in Table 5.

Comparative Example 9

Example 10 was followed except that glycerine carbonate was not added. The gel fraction is shown in Table 5.

TABLE 4

|  | Ex. 7 | Comp. Ex. 6 | Ex. 8 | Comp. Ex. 7 |
|---|---|---|---|---|
| Component (a), parts | Pro. Ex. 6 377 | Pro. Ex. 6 377 | Pro. Ex. 7 326 | Pro. Ex. 7 326 |
| Component (b), parts | DTMPTA 30 | DTMPTA 30 | DTMPTA 70 | DTMPTA 70 |
| Component (c), parts | TBABr 3 | TBABr 3 | TBAI 4 | TBAI 4 |
| Component (d), parts | Glycerine carbonate 20 | Not present | Glycerine carbonate 30 | Not present |
| Baking condition | 160° C. × 20 min | 160° C. × 20 min | 160° C. × 20 min | 160° C. × 20 min |
| Gel fraction, % | 91.9 | 78.6 | 89.9 | 80.2 |

TABLE 5

|  | Ex. 9 | Comp. Ex. 8 | Ex. 10 | Comp. Ex. 9 |
|---|---|---|---|---|
| Component (a), parts | Pro. Ex. 6 377 | Pro. Ex. 6 377 | Pro. Ex. 6 377 | Pro. Ex. 6 377 |
| Component (b), parts | LH437 127 | LH437 127 | HBA 20 | HBA 20 |

TABLE 5-continued

|  | Ex. 9 | Comp. Ex. 8 | Ex. 10 | Comp. Ex. 9 |
|---|---|---|---|---|
| Component (c), parts | CPC1 3 | CPC1 3 | CPC1 3 | CPC1 3 |
| Component (d), parts | Glycerine carbonate 20 | Not present | Glycerine carbonate 20 | Not present |
| Baking condition | 160° C. × 20 min | 160° C. × 20 min | 160° C. × 20 min | 160° C. × 20 min |
| Gel fraction, % | 94.8 | 84.2 | 93.4 | 81.7 |

Example 11

A blend of 405 parts (200 parts as solids) of the resin solution of Production Example 1, 80 parts of PETA, 40 parts of X-22-164B (methacrylate-modified polysiloxane at both terminals sold by Shin-Etsu Chemical Co., Ltd.) and 5 parts of tetrabutylammonium nitrate (TBANO) was applied on a tinplate, baked at 180° C. for 20 minutes, and tested for the gel fraction. The result is shown in Table 6.

Comparative Example 10

Example 11 was followed except that 405 parts (200 parts as solids) of the resin solution of Production Example 2 were replaced for the resin solution of Production Example 1. The gel fraction is shown in Table 6.

Example 12

A blend of 340 parts (200 parts as solids) of the resin solution of Production Example 8, 200 parts of KAYARAD DPCA-120 (dipentaerythritol (1 mole)/caprolactone (12 moles) adduct hexaacrylate sold Nippon Kayaku Co., Ltd.), 40 parts of glycerine carbonate and 4 parts of tetrabutylammonium phthalate (TBAPA) was applied on a tinplate, baked at 140° C. for 20 minutes, and tested for the gel fraction. The result is shown in Table 6.

TABLE 6

|  | Ex. 11 | Comp. Ex. 10 | Ex. 12 |
|---|---|---|---|
| Component (a), parts | PETA 80 X-22-164B 40 | PETA 80 X-22-164B 40 | DCPA-120 200 |
| Component (b), parts | Pro. Ex. 1 405 | Pro. Ex. 2 405 | Pro. Ex. 8 340 |
| Component (c), parts | TBANO 5 | TBANO 5 | TBAPA 4 |
| Component (d), parts | Contained in (b) | Not present | Glycerine carboante 40 |
| Baking condition | 180° C. × 20 min | 180° C. × 20 min | 140° C. × 20 min |
| Gel fraction, % | 84.1 | 0.0 | 91.2 |

Production Example 9

Production Example 1 was followed using the following monomer mixture.

| Material | Parts |
|---|---|
| 2-Acetoacetoxyethyl methacrylate | 191 |
| n-Butyl methacrylate | 88 |
| Methyl methacrylate | 171 |
| n-Butyl acrylate | 50 |
| KAYAESTER O | 15 |

An acryl resin solution having a nonvolatile content of 60.4%, Mn(GPC) of about 6,000, and active hydrogen equivalent weight of 281 was produced.

Example 13

A blend of 947 parts of the resin solution of Production Example 9, 100 parts of PETA, 16 parts of glycerine carbonate and 16 parts of TBABr was produced. To this were dispersed 28 parts of MITSUBISHI CARBON MA-100 (carbon black sold by Mitsubishi Chemical Corp.) in a paint shaker until a particle size of less than 30 μm was reached. This composition was applied on a tinplate, baked at 220° C. for 2 minutes, and tested for the gel fraction as in Example 1. The gel fraction was greater than 95%. The composition was stable upon storage at 40° C. for 10 days.

Example 14

Use in two coat-one baking coating

Step A

A zinc phosphate-treated steel plate having a thickness of 0.8 mm was coated with a cationic electrodeposition paint (POWER TOP PU-50 sold by Nippon Paint Co., Ltd.) electrically to a dry film thickness of about 25 microns and then with a mid-layer paint (ORGA P-2 SEALER sold by Nippon Paint Co., Ltd.) using an air spray gun to a dry film thickness of about 40 microns. The coated plate was then baked at 140° C. for 30 minutes.

Step B

| 1. Base Coat Formulation | |
|---|---|
| ALPASTE 7160 N[1] | 10 parts |
| Acrylic varnish[2] | 50 parts |
| CYMEL 202[3] | 10 parts |
| CYMEL 327[4] | 10 parts |
| Isopropyl alcohol | 7 parts |

Foot note:
[1] Aluminum flake pigment paste containing 65% aluminum flake sold by Toyo Aluminum Co., Ltd.
[2] 80% nonvolatile, hydroxyl number 100, acid number 30, Mn 1,800.
[3] Melamine resin sold by Mitsui Cyanamide Co., Ltd., 80% nonvolatile.
[4] Melamine resin sold by Mitsui Cyanamide Co., Ltd., 90% nonvolatile.

| 2. Top Coat Formulation | |
|---|---|
| Acrylic resin varnish of Pro. Ex. 7 | 405 parts |
| PETA | 80 parts |
| TBABr | 2 parts |
| Glycerine carbonate | 20 parts |
| TINUBIN 900[1] | 6 parts |
| SANOL LS-292[2] | 3 parts |

Foot note:
1) UV adsorber sold by Ciba-Geigy AG.
2) Hindered amine antioxidant sold by Sankyo Yuki K.K.

Onto the steel plate substrate prepared in Step A was applied the above base coat composition to a dry film thickness of about 16 microns by air spraying and allowed to set for about 7 minutes. Then, the above top coat composition adjusted to Ford cup #4 viscosity of 30 seconds at 20° C. was applied electrostatically on the base coat wet-on-wet to a dry film thickness of about 40 microns, allowed to set for about 7 minutes, and baked together with the base coat at 160° C. for 25 minutes. The resulting multi-layer film was evaluated for various items. The results are shown in Table 7.

Comparative Example 11

Example 14 was followed except that the top coat composition used was a conventional acrylic-melamine based composition of the following formulation. The results are shown in Table 7.

| Top Coat Formulation for Comparison | |
|---|---|
| DIANAL HR-554[1] | 58.3 parts |
| ACR-461[2] | 63.6 parts |
| YUBAN 20N-60[3] | 50.0 parts |
| TINUBIN 900 | 2.0 parts |
| SANOL LS-292 | 1.0 parts |
| n-Butanol | 1.3 parts |
| SOLVESSO 100 | 5.0 parts |

Foot note:
[1] Thermosetting acrylic varnish sold by Mitsubishi Rayon Co., Ltd., 60% nonvolatile.
[2] Thermosetting acrylic varnish sold by Nippon Paint Co., Ltd., 55% nonvolatile.
[3] Melamine resin sold by Mitsui Toatsu Chemicals, Inc., 60% nonvolatile.

TABLE 7

| Item | Ex. 12 | Comp. Ex. 11 |
|---|---|---|
| SVS, %[1] | 56.2 | 49.0 |
| Pencil hardness[2] | HB | F |
| Scratch resistance[3] | Good | Fair |
| Acid resistance[4] | Good | Not Good |

Evaluation method
1) Volumetric nonvolatile content (SVS):
The composition was adjusted to a Ford cup #4 viscosity at 30 sec. at 20° C . A 0.5 g aliquot was taken precisely, diluted with 3 ml of toluene, baked at 110° C. for 1 hour to determine the nonvolatile content by weight followed by the conversion into the volumetric nonvolatile content.
2) Pencil hardness:
The method of JIS K5400 8-4-2 was followed.
3) Scratch resistance:
One gram of a 50% aqueous dispersion of a commercial cleanser (NEW HOME CLEANSER sold by Kao Corporation) was applied on a flannel fabric of 2 cm×2 cm size. This fabric was attached to the reciprocating head of a Gakushin type dyeing fastness tester (Daiei Kagaku Seiki K.K.). The test specimen was rubbed with the head under a load of 500 g at 20 reciprocations and percents retention of 20° gloss was determined. The scratch resistance was evaluated according to the following schedule.
Very good: greater than 85%
Good: 70–85%
Fair: 40–70%
Not good: less than 40%
4) Acid resistance:
One drop (0.5 ml) of 0.1 N $H_2SO_4$ was pipetted on the specimen and allowed to stand at 75° C. for 30 minutes. Then the change in appearance was observed visually. Judgment was made by the following schedule.
Very good: No trace was observed.
Good: Slight trace was observed.
Fair: Remarkable trace was observed.
Not good: Film was partly eroded.

We claim:
1. A one-component, thermosetting resin composition for coating use comprising:
(a) a component containing of α, β-ethylenically unsaturated carbonyl groups in the molecule;
(b) a component containing a plurality of an activated methylene group or an activated methyne group in the molecule;
(c) a quaternary ammonium salt, a quaternary phosphonium salt or a tertiary sulfonium salt, having a halide monobasic carboxylate, polybasis carboxylate, nitrate, nitrite, sulfonate, sulfite, phosphate or acid phosphate ester counter anion;
(d) a five-membered cyclic compound as an independent component or covalently attached to at least one of said component (a) and said component (b).
2. The composition according to claim 1, wherein said component (a) is a polyol poly(meth)acrylate, an unsaturated polyester resin, a polyester acrylate resin, an epoxy acrylate resin, a urethane acrylate resin, a polyether acrylate resin, an α, β-unsaturated carbonyl group-containing acrylic resin, or a silicone oligomer having (meth)acryloyl groups.
3. The composition according to claim 1, wherein said component (b) is an ester of an activated methylene- or methynecarboxylic acid with a nonpolymeric or polymeric polyol, a reaction product of a polyamine with diketene, a polymer of an activated methylene group-containing acrylic monomer, or an adduct of an isocyanate compound with an activated methylene compound.
4. The composition according to claim 1, wherein the onium cation of said component (c) is a tetraalkylammonium, trialkylaralkylammonium, alkylpyridinium, tetraalkylphosphonium or trialkylsulfonium cation.
5. The composition according to claim 1, wherein said component (d) is a cyclic 1,2-alkylenecarbonate or glycerine carbonate independently added to the composition.
6. The composition according to claim 1, wherein at least one of said component (a) and said component (b) is an acrylic resin or polymer, and wherein said component (d) is glycerine carbonate (meth)acrylate copolymerized with a monomeric constituent of said acrylic resin or polymer.
7. In a method of forming a multi-layer coating film on a substrate comprising the steps of applying onto the substrate a colored base coat composition, applying a clear top coat composition thereon wet-on-wet, and baking both coats simultaneously, the improvement wherein said clear top coat composition is the composition of claim 1.
8. The composition of claim 1, wherein component (a) is a resin having a molecular weight between 400 and 100,000.
9. The composition of claim 1, wherein component (b) is a resin having a molecular weight between 400 and 100,000.
10. The composition of claim 1, wherein the counteranion for the quaternary ammonium salt, quaternary phosphonium salt or tertiary sulfonium salt, component (c), is acetate, laurate, glycolate, benzoate, salicylate, phthalate, chloride, bromide, iodide, methanesulfonate, p-toluenesulfonate, dodecylbenzene sulfonate, triflate, nitrate, sulfate, methosulfate, phoshphate or acid t-dibutylphosphate.
11. The composition of claim 1, wherein the proportion of components (a) and (b) is between 2:1 and 1:2 on the basis of the number ethylenically unsaturated carbonyl groups in (a) to activated methylene or methyne groups in (b), the proportion of component (c) is between 0.1 and 10.0 equivalent % based on the sum of (a) and (b), and the proportion of component (d) is between 0.5 and 100 equivalent % based on the sum of (a) and (b).
12. The composition of claim 1, wherein the proportion of components (a) and (b) is between 1.5:1 and 1:1.5 on the basis of the number ethylenically unsaturated carbonyl groups in (a) to activated methylene or methyne groups in (b), the proportion of component (c) is between 0.2 and 5.0 equivalent % based on the sum of (a) and (b), and the proportion of component (d) is between 5.0 and 40 equivalent % based on the sum of (a) and (b).

13. A one-component, thermosetting resin composition for coating formed from a mixture comprising:

(a) a component containing a plurality of α, β-ethylenically unsaturated carbonyl groups in the molecule;

(b) a component containing a plurality of an activated methylene group or an activated methyne group in the molecule;

(c) a quaternary ammonium salt, a quaternary phosphonium salt or a tertiary sulfonium salt, having a halide, monobasic carboxylate, polybasic carboxylate, nitrate, nitrite, sulfonate, sulfate, sulfite, phosphate or acid phosphate ester counter anion;

(d) a five-membered cyclic carbonate compound as an independent component or covalently attached to at least one of said component (a) and said component (b).

* * * * *